US009986416B2

(12) United States Patent
Delos Reyes et al.

(10) Patent No.: US 9,986,416 B2
(45) Date of Patent: May 29, 2018

(54) MTC DEVICE PING MESSAGES VIA TRACKING AREA UPDATES

(71) Applicant: Verizon Patent and Licensing Inc., Arlington, VA (US)

(72) Inventors: Emerando M. Delos Reyes, Pleasant Hill, CA (US); Priscilla Lau, Fremont, CA (US); Wing-Cheong V. Yeung, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days. days.

(21) Appl. No.: 15/218,535

(22) Filed: Jul. 25, 2016

(65) Prior Publication Data

US 2018/0027404 A1    Jan. 25, 2018

(51) Int. Cl.
| | |
|---|---|
| *H04W 24/00* | (2009.01) |
| *H04W 8/08* | (2009.01) |
| *H04W 4/00* | (2018.01) |
| *H04W 76/04* | (2009.01) |
| *H04L 29/08* | (2006.01) |
| *H04L 12/26* | (2006.01) |
| *H04W 84/04* | (2009.01) |

(52) U.S. Cl.
CPC ........... *H04W 8/08* (2013.01); *H04L 43/0864* (2013.01); *H04L 43/106* (2013.01); *H04L 67/28* (2013.01); *H04W 4/005* (2013.01); *H04W 76/045* (2013.01); *H04W 84/042* (2013.01)

(58) Field of Classification Search
CPC . H04W 24/00; H04W 12/02; H04W 36/0033; H04W 36/0038; H04W 40/00; H04W 48/08; H04W 72/04; H04W 76/021; H04W 76/025

USPC .... 455/433, 466, 418, 435.1, 436, 440, 423, 455/458, 434, 456.6
See application file for complete search history.

(56) References Cited

U.S. PATENT DOCUMENTS

| | | | |
|---|---|---|---|
| 9,071,951 B2* | 6/2015 | Arvidsson ............. | H04W 60/00 |
| 2005/0111487 A1* | 5/2005 | Matta .................. | H04L 41/0896 370/468 |
| 2008/0259813 A1* | 10/2008 | Matta .................. | H04L 41/0896 370/252 |
| 2011/0216732 A1* | 9/2011 | Maeda .................... | H04W 4/08 370/329 |
| 2011/0261787 A1* | 10/2011 | Bachmann ............ | H04L 63/029 370/331 |
| 2014/0321328 A1* | 10/2014 | Zuniga .................... | H04W 8/06 370/254 |
| 2015/0124585 A1* | 5/2015 | Sahin .................... | H04W 36/12 370/218 |

(Continued)

*Primary Examiner* — Joseph Arevalo

(57) ABSTRACT

A computer device may include logic configured to intercept a tracking area update response from a wireless network device to a user equipment device and trigger a device ping process for the user equipment device, in response to intercepting the tracking area update response. The logic may be further configured to generate a device ping message based on the triggering; send the device ping message to an application system associated with the user equipment device; receive a device ping response from the application system; incorporate information from the device ping response into the intercepted tracking area update response; and send the tracking area update response with the incorporated device ping information to the user equipment device.

20 Claims, 9 Drawing Sheets

(56) References Cited

U.S. PATENT DOCUMENTS

2015/0264553 A1\* 9/2015 Janosi ..................... H04W 8/12
    455/433
2017/0181213 A1\* 6/2017 Barkan ............... H04W 76/025

\* cited by examiner

US 9,986,416 B2

MTC DEVICE PING MESSAGES VIA TRACKING AREA UPDATES

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A wireless access network may manage a large number of devices. For example, a base station may service a large number of wireless devices. At times, users of the wireless devices may select to communicate or receive information within a particular period of time, overwhelming the resources of the base station or the wireless access network.

DETAILED DESCRIPTION OF PREFERRED EMBODIMENTS

Figure 1:
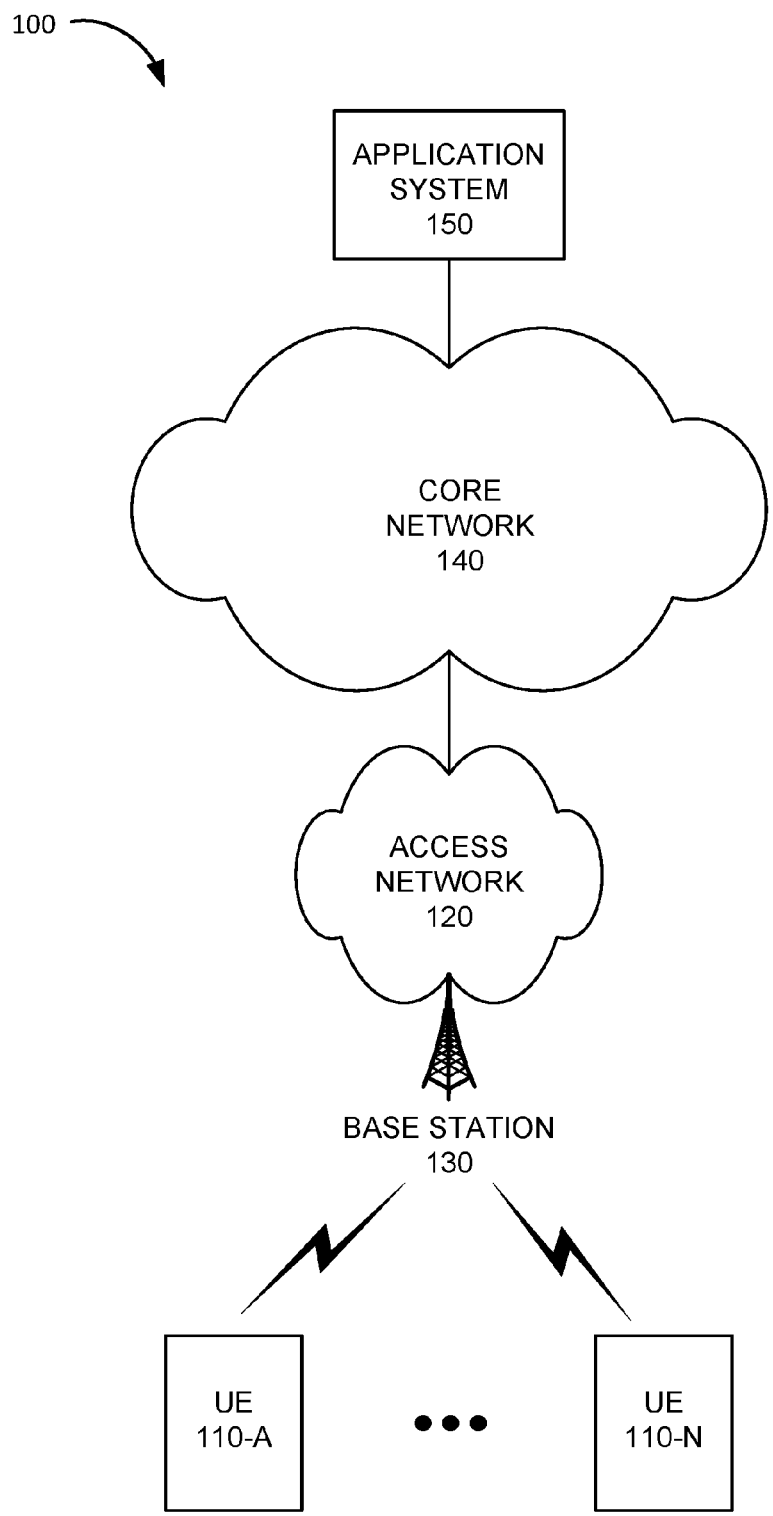
FIG. 1 is a diagram illustrating an environment according to an implementation described herein.

The following detailed description refers to the accompanying drawings. The same reference numbers in different drawings identify the same or similar elements.

A provider of wireless communication services may manage wireless access networks that include a large number of network devices. For example, a wireless access network may provide communication services for devices in Internet of Things (IoT) applications. Such devices may communicate using machine-to-machine (M2M) communication, such as machine-type communication (MTC), a type of M2M communication standardized by the $3^{rd}$ Generation Partnership Project (3GPP), and/or another type of M2M communication. Examples of MTC devices may include utility meters, parking meters, road sensors, environmental sensors, security sensors, traffic and/or road lights, traffic cameras, advertising displays, vehicle telematics devices, point-of-sale terminals, vending machines, health monitoring devices, remote diagnostics devices, access control device, manufacturing controllers, and/or other types of devices. MTC devices are envisioned to increase exponentially and may result in a large number of such devices being serviced by a wireless access network. Estimates indicate that the number of MTC devices within a wireless operator's network may increase to hundreds of millions of devices communicating with each other autonomously with little to no human intervention.

While in many cases the data consumption of MTC devices may be small (e.g., 1 Megabyte or less) compared to other types of devices, such as mobile phones used for voice communication or for receiving streaming content, significant challenges may nevertheless arise when a large number of MTC devices are connected to a network. For example, MTC devices may maintain connectivity with a host device, such as an application system, using ping messages.

"Ping," also known as Packet Internet Groper, is a network utility used in digital communication. The ping utility, which operates by sending Internet Control Message Protocol (ICMP) echo request packets to a target host, was originally designed for Local Area Network (LAN) based communication to test the quality of the network connection between a remote device and the host. The result of a ping test may include, for example, the summary of the round-trip time from transmission to reception and/or information relating to any packet loss associated with the transmission. Furthermore, the ping utility may be executed with various commands to enable particular operational modes.

The ping utility may be used by mobile wireless devices to establish and maintain connectivity with mobile applications that reside on a remote location, such as on a server device on the Internet or on a wireless access network device. For example, a mobile wireless device may send ping messages at regular intervals to an application server to keep a bearer channel active between the mobile wireless device and the application server. The ping messages inform the application server that the mobile wireless device is connected and ready to exchange information. Use of ping messages may tie up network resources, such as radio link resources, as well as other types of wireless access network resources. For example, some MTC devices may be configured to send a ping message to a host device on the network once a minute or even several times per minute.

Implementations described herein relate to making use of a Tracking Area Update (TAU) procedure to exchange messages between a wireless device, also referred to herein as a user equipment (UE) device, and a remote host device. This use of the TAU procedure may be used to exchange ping messages and/or other types of messages between the UE device and the remote host device, such as an application server. The wireless network device that manages the TAU procedure may thus serve as an intermediate communicator between the UE device and the remote host device, so that the UE device does not have to ping the remote device and tie up wireless network resources. In general, a TAU procedure may be triggered at a less frequent interval than a ping procedure, resulting in a reduced number of messages sent over a radio link of a wireless access network. The TAU procedure thus does not continuously hold up the radio link. In turn, network resources may be saved from being unnecessarily allocated to a device that only requires periodic communication, thereby allowing for increased network capacity and efficiency. Furthermore, as the number of MTC devices in the network increases, the use of a TAU procedure to provide an exchange of messages with the MTC devices may be more scalable.

TAU may be used to periodically notify the network about the availability and location of a UE device. The TAU procedure may be controlled by the UE device using a periodic tracking area update timer (e.g., timer T3412). The value of the timer is sent by the network to the UE device in an ATTACH ACCEPT message and may be sent in a TRACKING AREA UPDATE ACCEPT message and/or another type of message. The UE device may apply the timer value in all tracking areas of a list of tracking areas assigned to the UE device, until a new value is received. For example, a TAU may be triggered by a mobile UE when the UE detects that it has moved to a new tracking area. As another example, a TAU may be triggered when a TAU timer expires. Thus, when the TAU timer expires, the UE device may trigger the TAU procedure and contact the wireless access network. For example, many MTC devices may be stationary and may not move into new tracking areas. TAU timer value may also be configurable and may be customized by the network operator based on the UE device and the application that it tries to access. However, MTC devices may be required to run a TAU timer and may contact a node of a wireless access network, such as a Mobility Management Entity (MME) device of a Long Term Evolution (LTE) wireless access network, each time the TAU timer runs out.

In order to enable communication between a UE device and a remote host device, a new function may be defined in the wireless access network called an MTC Device Status Update (M-DSU) proxy. In some implementations, the M-DSU proxy may be implemented within a MME device. In other implementations, the M-DSU proxy may be implemented in a stand-alone device or in another device of a wireless access network. M-DSU proxy may be configured to intercept a TAU message from a UE device and to generate a message to a remote host device associated with the UE device, such as an application server. The M-DSU proxy may receive a response from the remote host device and may incorporate the response into a TAU response that is sent back to the UE device.

A computer device, such as an MME device, and/or the remote host device, such as the application server, may instruct or otherwise configure the UE device to cease sending ping messages to the remote host device. The UE device may be instructed to instead retrieve ping message information from TAU responses received from the wireless access network. The UE device may then send a TAU message to the wireless access network when a TAU timer expires, and/or based on another type of triggering event such as a detected alarm condition, a detected fault condition, and/or a detected sensor event.

The computer device may receive the TAU request from a UE device and process the TAU request by sending the TAU request to a Home Subscriber Server (HSS) device (and/or to another wireless network device). The computer device may receive a TAU response from the HSS, intercept the TAU response, and trigger a device ping process in response to intercepting the TAU response. The computer device may generate a device ping message based on the triggering and send the device ping message to an application system associated with the UE device. The computer device may receive a device ping response from the application system, incorporate information from the device ping response into the intercepted TAU response, and send the TAU response with the incorporated device ping information to the UE device. The UE device may receive the TAU response, retrieve the device ping information from the received TAU response, and process the retrieved device ping information.

In some implementations, the UE device may correspond to an MTC device. In other implementations, the UE device may correspond to a user device, such as a handheld mobile wireless communication device (e.g., a smart phone, tablet, etc.). In some implementations, the device ping information incorporated into the TAU response may include ping message information, such as an Internet Protocol (IP) address associated with the application system, packet loss information, roundtrip time information, and/or other types of ping message information. In other implementations, the device ping information may include additional or different types of information. For example, the device ping information may include an update from the application system for the UE device. The update may include instructions for the UE device, an application update for the UE device, a request for the UE device to provide a particular type of information to the application system, authentication information for the UE device, and/or other types of information.

In some implementations, when the computer device generates the device ping message for the application system, the computer device may include additional information in the device ping message. For example, the computer device may include in the device ping message information associated with the UE device, such as location information for the UE device, information identifying a state of the UE device (e.g., active, idle, powered down, etc.), information identifying group membership for the UE device (e.g., a particular sensor set, etc.), information identifying a battery level for the UE device, information identifying one or more signal quality metrics for the UE device, and/or other types of UE information. In some implementations, the UE device may be configured to provide some or all of the UE information in the TAU message sent to the wireless access network. In other implementations, the wireless access network may query the UE device for some or all of the UE information. In yet other implementations, the wireless access network may maintain some or all of the UE information in a database and/or may obtain the UE information using another technique.

FIG. 1 is a diagram of an exemplary environment 100 in which the systems and/or methods, described herein, may be implemented. As shown in FIG. 1, environment 100 may include user equipment (UE) devices 110-A to 110-N (referred to herein collectively as "UE devices 110" and individually as "UE device 110"), an access network 120, a core network 140, and an application system 150.

In some implementations, UE device 110 may correspond to an embedded wireless device that communicates wirelessly with other devices over an M2M interface using MTC and/or another type of M2M communication. As an example, UE device 110 may be electrically connected to a sensor device, an actuator device, a microcontroller controlling one or more sensors, a microcontroller controlling one or more actuators, a microcontroller that performs data processing, and/or another type of MTC device. Examples of such devices may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), and/or another type of electronic device.

In other implementations, UE device 110 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; a home appliance device; a home monitoring device; and/or any other type of computer device with wireless communication capabilities.

Access network 120 may provide access to core network 140 for wireless devices, such as UE device 110. Access network 120 may enable UE device 110 to provide mobile telephone service and/or data services to UE device 110. Access network 120 may include a base station 130 and UE device 110 may wirelessly communicate with access network 120 via base station 130. Base station 130 may service UE devices 110-A to 110-N. In other words, UE devices 110-A to 110-N may be located within the geographic area serviced by base station 130. Access network 120 may establish a packet data network connection between UE device 110 and core network 140. For example, access network 120 may establish an Internet Protocol (IP) connection between UE device 110 and core network 140.

In some implementations, access network 120 may include a Long Term Evolution (LTE) access network (e.g., an evolved packet core (EPC) network) based on the LTE standard specified by the 3$^{rd}$ Generation Partnership Project (3GPP) and/or other standards. In other implementations, access network 120 may include a Code Division Multiple Access (CDMA) access network based on, for example, a CDMA2000 standard. For example, the CDMA access network may include a CDMA enhanced High Rate Packet Data (eHRPD) network (which may provide access to an LTE access network).

Core network 140 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. Core network 140 may allow the delivery of Internet Protocol (IP) services to UE device 110, and may interface with other external networks. Core network 140 may include one or more server devices and/or network devices, or other types of computation or communication devices. In one example implementation, core network 140 may include an Internet Protocol Multimedia Subsystem (IMS) network (not shown in FIG. 1). An IMS network may include a network for delivering IP multimedia services as specified by 3GPP or other standards/protocols and may provide media flows between UE device 110 and external IP networks or external circuit-switched networks (not shown in FIG. 1).

Application system 150 may include one or more devices, such as computer devices and/or hardware or software server devices, which hosts one or more applications to manage UE devices 110-A to 110-N. For example, application system 150 may be configured to exchange ping messages with UE devices 110. Application system 150 may register UE device 110, authenticate UE device 110, configure UE device 110, and/or otherwise manage UE device 110. Furthermore, application system 150 may provide instructions to UE device 110 to perform one or more actions, may request that UE device 110 send data to application system 150, may provide data to UE device 110, may send an update to UE device 110, and/or may perform another type of action with respect to UE device 110.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
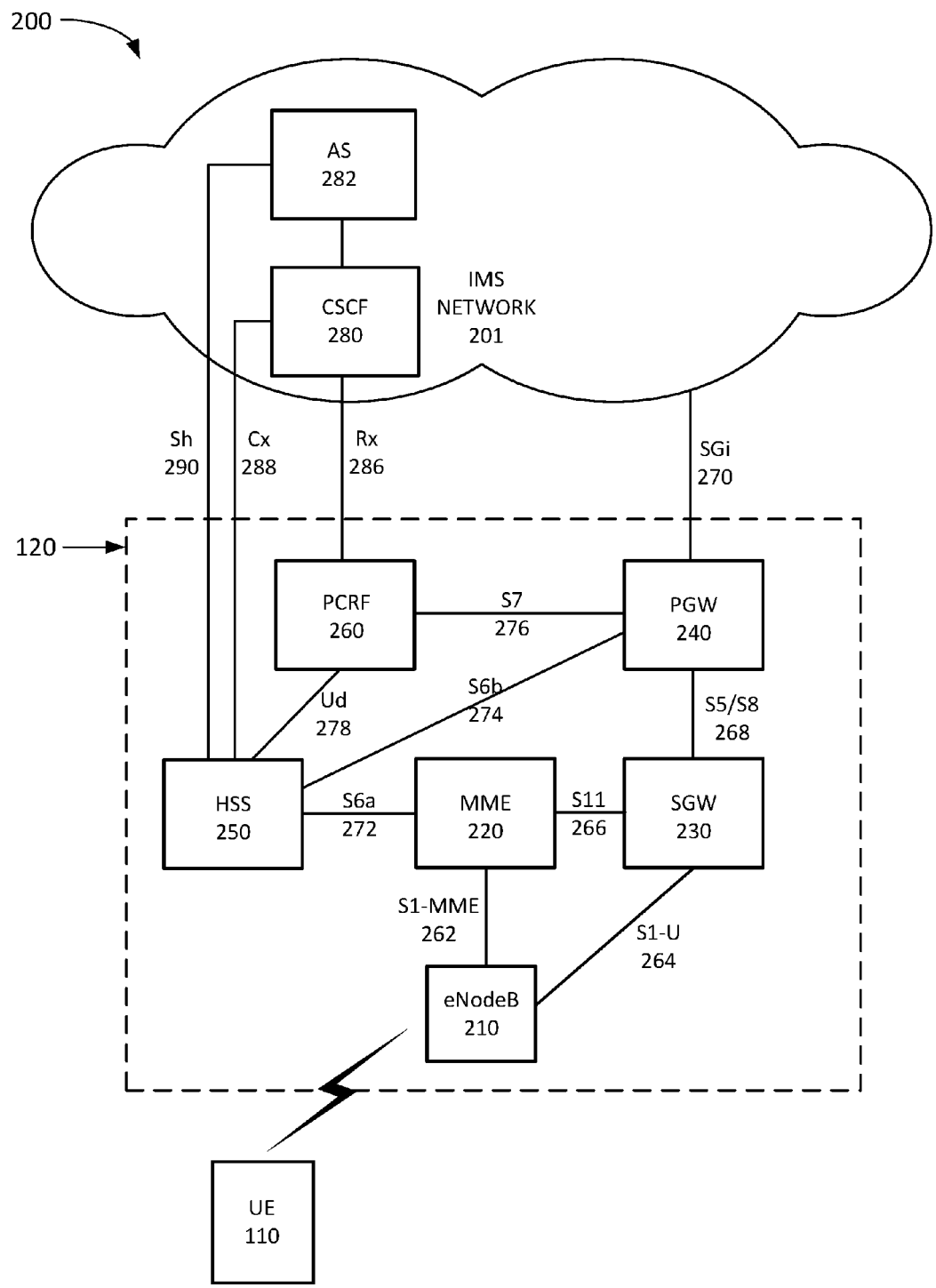
FIG. 2 is a diagram illustrating exemplary components of the access network of FIG. 1 and exemplary components of an Internet Protocol Multimedia Subsystem network that may be included in the core network of FIG. 1.

FIG. 2 is a diagram illustrating exemplary components of a system 200 that includes access network 120 and an IMS network 201 according to an implementation described herein. IMS network 201 may be included in core network 140 and may include a network for delivering IP multimedia services as specified by 3GPP or other standards/protocols and may provide media flows between UE device 110 and external IP networks or external circuit-switched networks. In some implementations, IMS network 201 may be used to deliver an update from update system 150 to UE device 110.

As shown in FIG. 2, system 200 may include UE device 110, access network 120, and IMS network 201. Access network 120 may correspond to a Long Term Evolution (LTE) access network. Access network 120 may include one or more devices that implement logical entities interconnected via standardized interfaces, and that provide wireless packet-switched services and wireless IP connectivity to user devices for both data and voice services. Access network 120 may include eNodeB 210 (corresponding to base station 130), a mobility management entity (MME) 220, a serving gateway (SGW) 230, a packet data network gateway (PGW) 240, a home subscriber server (HSS) 250, and a Policy and Charging Rules Function (PCRF) 260. IMS network 201 may include a Call Session Control Function (CSCF) 280 and an application server (AS) 282. While FIG. 2 depicts a single eNodeB 210, MME 220, SGW 230, PGW 240, HSS 250, PCRF 260, CSCF 280, and AS 282 for illustration purposes, in other implementations, FIG. 2 may include multiple eNodeBs 210, MMES 220, SGWs 230, PGWs 240, HSS 250, PCRFs 260, CSCFs 280, and/or AS 282.

eNodeB 210 may include one or more devices (e.g., base stations) and other components and functionality that allow UE device 110 to wirelessly connect to access network 120. eNodeB 210 may include or be associated with one or more cells. For example, each cell may include a radio frequency (RF) transceiver facing a particular direction. eNodeB 210 may interface with access network 120 via an interface referred to as an S1 interface, which may be split into a control plane S1-MME interface 262 and a data plane S1-U interface 264. S1-MME interface 262 may interface with MME 220. S1-MME interface 262 may be implemented, for example, with a protocol stack that includes a Network Access Stratum (NAS) protocol and/or Stream Control Transmission Protocol (SCTP). An S1-U interface 264 may interface with SGW 230 and may be implemented, for example, using GTPv2.

MME 220 may implement control plane processing for access network 120. For example, MME 220 may implement tracking and paging procedures for UE device 110, may activate and deactivate bearers for UE device 110, may authenticate a user of UE device 110, and may interface to non-LTE radio access networks. A bearer may represent a logical channel with particular quality of service (QoS) requirements. MME 220 may also select a particular SGW 230 for a particular UE device 110. A particular MME 220 may interface with other MMES 220 in access network 120 and may send and receive information associated with UE devices 110, which may allow one MME 220 to take over control plane processing of UE devices serviced by another MME 220, if the other MME 220 becomes unavailable.

SGW 230 may provide an access point to and from UE device 110, may handle forwarding of data packets for UE device 110, and may act as a local anchor point during handover procedures between eNodeBs 210. SGW 230 may interface with PGW 240 through an S5/S8 interface 268. S5/S8 interface 268 may be implemented, for example, using GTPv2.

PGW 240 may function as a gateway to core network 140 and/or IMS network 201 through an SGi interface 270. A particular UE device 110, while connected to a single SGW 230, may be connected to multiple PGWs 240, one for each packet network with which UE device 110 communicates.

MME 220 may communicate with SGW 230 through an S11 interface 266. S11 interface 266 may be implemented, for example, using GTPv2. S11 interface 266 may be used to create and manage a new session for a particular UE device 110. S11 interface 266 may be activated when MME 220 needs to communicate with SGW 230, such as when the particular UE device 110 attaches to access network 120, when bearers need to be added or modified for an existing session for the particular UE device 110, when a connection to a new PGW 240 needs to be created, or during a handover procedure (e.g., when the particular UE device 110 needs to switch to a different SGW 230).

HSS 250 may store information associated with UE devices 110 and/or information associated with users of UE devices 110. For example, HSS 250 may store subscription profiles that include authentication and access authorization information. Each subscription profile may include a list of UE devices 110 associated with the subscription as well as an indication of which UE device 110 is active (e. g., authorized to connect to access network 120 and to IMS network 201 via access network 120).

MME 220 may communicate with HSS 250 through an S6a interface 272. S6a interface 272 may be implemented, for example, using a Diameter protocol. PGW 240 may communicate with HSS 250 through an S6b interface 274. S6b interface 274 may be implemented, for example, using a Diameter protocol.

PCRF 260 may implement policy charging and rule functions, such as establishing QoS requirements, bandwidth, and/or charges for a particular service for a UE device 110. PCRF 260 may communicate with PGW 240 through an S7 interface 276 and may communicate with HSS 250 through a Ud interface 278. S7 interface 276 may be based on a legacy Gx interface and may be implemented, for example, using Diameter protocol. Ud interface 278 may be used to exchange subscription data between PCRF 260 and HSS 250 and may be based on a provider specified protocol.

IMS network 201 may be associated with an IMS core identity for a particular subscription for UE device 110. HSS 250 may receive information identifying the IMS core identity for a subscription and may provide the IMS core identity to a particular UE device 110 that is connected to access network 120. CSCF 280 may handle signaling, controlling of media paths, and activation of applications in IMS network 201. AS 282 may implement particular services and interact with CSCF 280 to deliver the particular services to UE device 110. Examples of services provided by AS 282 may include update services for application system 150. CSCF 280 may communicate with PCRF 260 through an Rx interface 286 and may communicate with HSS 250 through a Cx interface 288. Rx interface 286 and Cx interface 288 may be implemented, for example, using Diameter protocol. AS 282 may communicate with HSS 250 through an Sh interface 290. Sh interface 290 may be implemented, for example, using Diameter protocol. In some implementations, application system 150 may include AS 282. In other implementations, application system 150 may be separate from IMS network 201.

Although FIG. 2 shows exemplary components of access network 120 and IMS network 201, in other implementations, access network 120 and/or IMS network 201 may include fewer components, different components, differently arranged components, or additional components than depicted in FIG. 2. Additionally or alternatively, one or more components of access network 120 and/or IMS network 201 may perform functions described as being performed by one or more other components of access network 120 and/or IMS network 201.

Figure 3:
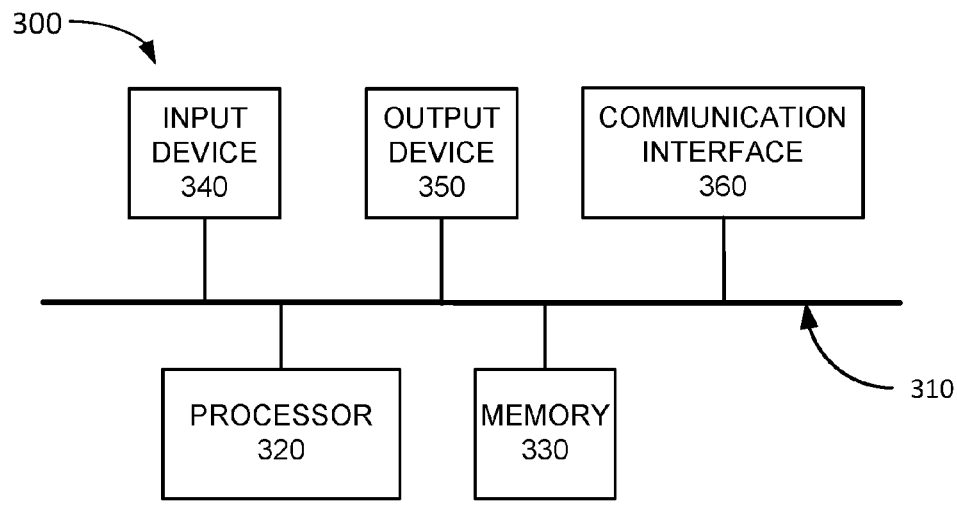
FIG. 3 is a diagram illustrating exemplary components of a device that may be included in a component of FIG. 2.

FIG. 3 is a diagram illustrating exemplary components of device 300 according to an implementation described herein. MME 220, SGW 230, PGW 240, HSS 250. PCRF 260, CSCF 280, AS 282, and/or application system 150 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to sending, receiving, and/or processing of ping messages, or other types of messages, via tracking area updates. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4:
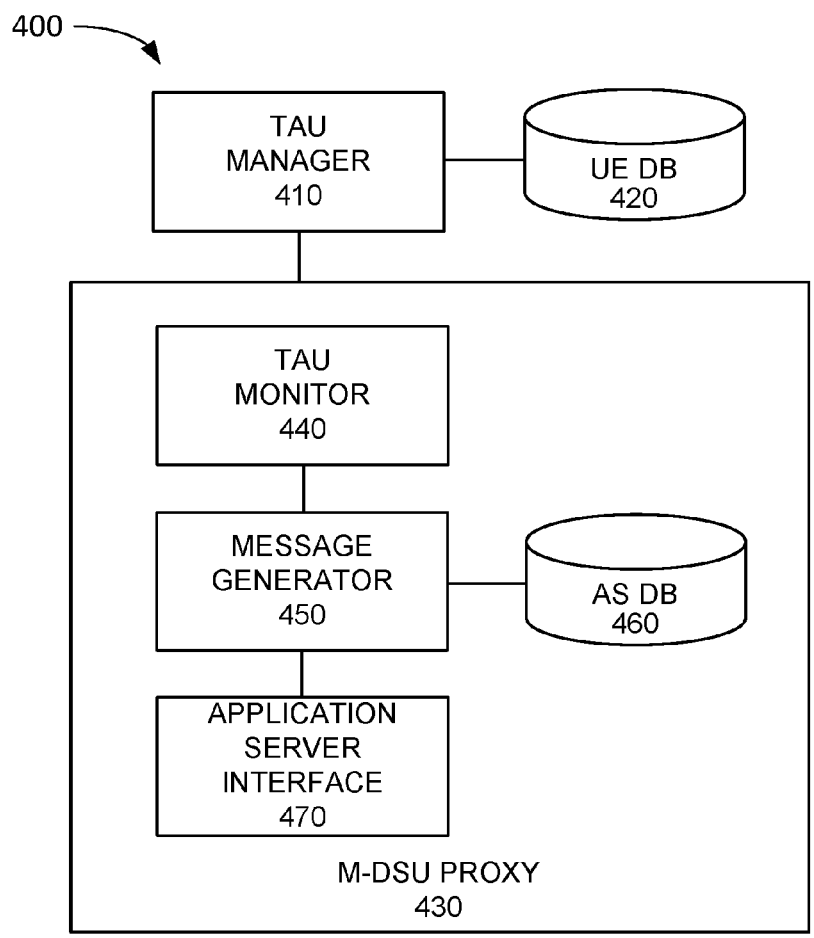
FIG. 4 is a diagram illustrating exemplary functional components of the device of FIG. 3.

FIG. 4 is a diagram illustrating a device 400 that includes exemplary functional components implemented in MME 220. In other implementations, some or all of device 400 may be implemented by one or more other components of access network 120, such as a stand-alone MTC device status update proxy device that is separate from MME 220, and/or by another component of access network 120 (e.g., eNodeB 210, SGW 230, PGW 240, HSS 250, etc.). The functional components of device 400 may be implemented, for example, via processor 320 executing instructions from memory 330 (or via processing unit 510 of FIG. 5 discussed below executing instructions from memory 520 if device 400 is included in eNodeB 210). Alternatively, some or all of the functional components included in system 400 may be implemented via hard-wired circuitry. As shown in FIG. 4, device 400 may include a TAU manager 410, a UE database (DB) 420, and an M-DSU proxy 430.

TAU manager 410 may manage the sending and receiving of TAU messages and TAU responses based on information stored in UE DB 420. UE DB 420 may store information relating to particular UE device 110. For example, UE DB 420 may associate a particular UE device 110 with a particular HSS 250 and with a particular tracking area. Furthermore, in some implementations, UE DB 420 may store additional information collected by MME 220 that may be sent to application system 150 in a ping message, such as location information for UE device 110, information identifying a state of UE device 110 (e.g., whether UE device 110 is active, idle, powered down, etc.), information identifying group membership for UE device 110 (e.g., a particular sensor set, a particular subscription, etc.), information identifying a battery level for UE device 110, information identifying one or more signal quality metrics for UE device 110, and/or other types of UE device information.

TAU manager 410 may receive a TAU message from UE device 110, provide the TAU message to HSS 250 associated with UE device 110 based on information stored in UE DB 420, receive a TAU response from HSS 250, and provide the TAU response to UE device 110. The TAU response may be intercepted by M-DSU proxy 430 before the TAU response is sent to UE device 110.

M-DSU proxy 430 may be configured to send ping messages to application system 150 on behalf of UE device 110 and receive ping message responses from application system 150 for UE device 110. M-DSU proxy 430 may include a TAU monitor 440, a message generator 450, an application system (AS) DB 460, and an application server interface 470.

TAU monitor 440 may monitor TAU manager 410 for TAU response messages. When a TAU response message is detected, TAU monitor 440 may intercept the TAU response and prevent TAU manager 410 from sending the TAU response to UE device 110 until a ping response is received from application system 150 and incorporated into the TAU response.

Message generator 450 may generate a ping message in response to TAU monitor 440 intercepting a TAU message. Message generator 450 may generate a device ping message based on information stored in AS DB 460. AS DB 460 may store information that associates particular UE devices 110 with particular application systems 150. For example, for a particular UE device 110, AS DB 460 may store information identifying an application system 150 associated with the particular UE device 110. In some implementations, a particular UE device 110 may be associated with multiple application systems 150. For example, the particular UE device 110 may be running multiple applications and each application may be associated with a particular application system 150. Message generator 450 may generate a device ping message for each application system 150 associated with the particular UE device 110.

Application server interface 470 may communicate with application system 150. For example, application server interface 470 may establish a communication session with application system 150 and may send the generated device ping message to application system 150. Furthermore, application server interface 470 may receive a ping response from application system 150. M-DSU proxy 430 may incorporate information from the received ping response into the intercepted TAU response.

Although FIG. 4 shows exemplary components of device 400, in other implementations, device 400 may include fewer components, different components, additional components, or differently arranged components than depicted in FIG. 4. Additionally or alternatively, one or more components of device 400 may perform one or more tasks described as being performed by one or more other components of device 400. For example, while M-DSU proxy 430 is shown as being implemented in device 400, in other implementations, M-DSU proxy 430 may be implemented in a separate device from the other components of device 400. For example, device 400 may be implemented in MME 220 and M-DSU proxy 430 may be implemented in a device separate from MME 220.

Figure 5:
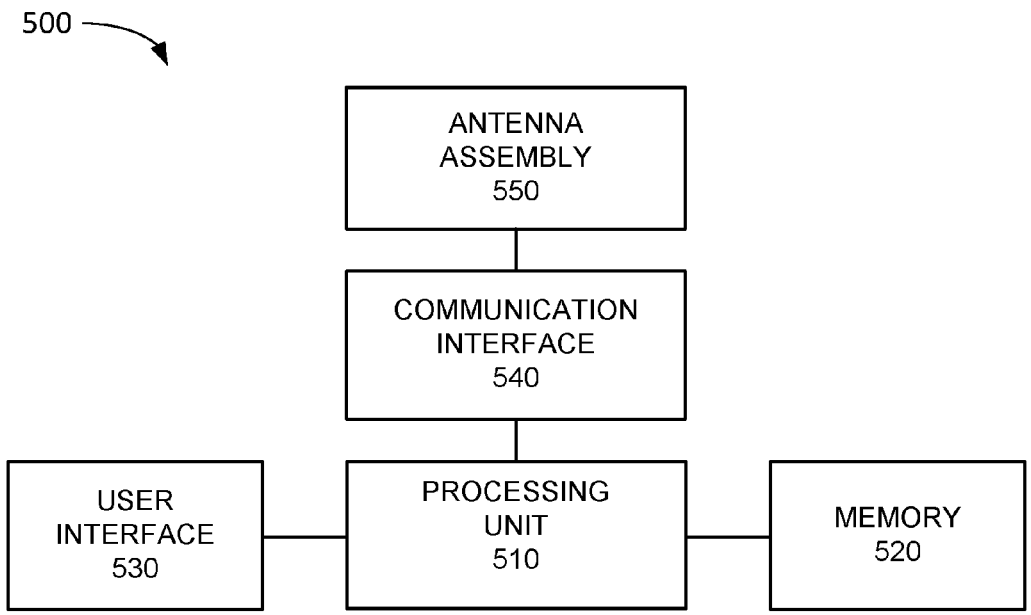
FIG. 5 is a diagram illustrating exemplary components of the user equipment device or base station of FIG. 1.

FIG. 5 is a diagram illustrating exemplary components of device 500 according to an implementation described herein. UE 110 and/or eNodeB 210 may each include one or more of devices 500. As shown in FIG. 5, device 500 may include a processing unit 510, a memory 520, a user interface 530, a communication interface 540, and an antenna assembly 550.

Processing unit 510 may include one or more single-core or multi-core processors, microprocessors, microcontrollers, application specific integrated circuits (ASICs), field programmable gate arrays (FPGAs), graphical processing units (GPUs), and/or other processing logic. Processing unit 510 may control operation of device 500 and its components.

Memory 520 may include any type of dynamic storage device that may store information and/or instructions, for execution by processing unit 510, and/or any type of nonvolatile storage device that may store information for use by processing unit 510. For example, memory 520 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

User interface 530 may allow a user to input information to device 500 and/or to output information from device 500. Examples of user interface 530 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as an LCD, to output visual information; an actuator to cause device 500 to vibrate; and/or any other type of input or output device. In some implementations, device 500 may be managed remotely and may not include user interface 530. In other words, device 500 may be "headless" and may not include a display, for example.

Communication interface 540 may include a transceiver that enables device 500 to communicate with other devices and/or systems via wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 540 may include a transmitter that converts baseband signals to RF signals and/or a receiver that converts RF signals to baseband signals. Communication interface 540 may be coupled to antenna assembly 550 for transmitting and receiving RF signals.

Communication interface 540 may also include a logical component that includes input and/or output ports, input and/or output systems, and/or other input and output components that facilitate the transmission of data to other devices. For example, communication interface 540 may include a network interface card (e.g., Ethernet card) for wired communications and/or a wireless network interface (e.g., a WiFi) card for wireless communications. Communication interface 540 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 550 may include one or more antennas to transmit and/or receive RF signals. Antenna assembly 550 may, for example, receive RF signals from communication interface 540 and transmit the signals and receive RF signals and provide them to communication interface 540.

As described herein, device 500 may perform certain operations in response to processing unit 510 executing software instructions contained in a computer-readable medium, such as memory 520. A computer-readable medium may be defined as a non-transitory memory device. A non-transitory memory device may include memory space within a single physical memory device or spread across multiple physical memory devices. The software instructions may be read into memory 520 from another computer-readable medium or from another device via communication interface 540. The software instructions contained in memory 520 may cause processing unit 510 to perform processes that will be described later. Alternatively, hard-wired circuitry may be used in place of, or in combination with, software instructions to implement processes described herein. Thus, implementations described herein are not limited to any specific combination of hardware circuitry and software.

Although FIG. 5 shows example components of device 500, in other implementations, device 500 may include fewer components, different components, differently arranged components, or additional components than depicted in FIG. 5. Additionally or alternatively, one or more components of device 500 may perform the tasks described as being performed by one or more other components of device 500.

Figure 6:
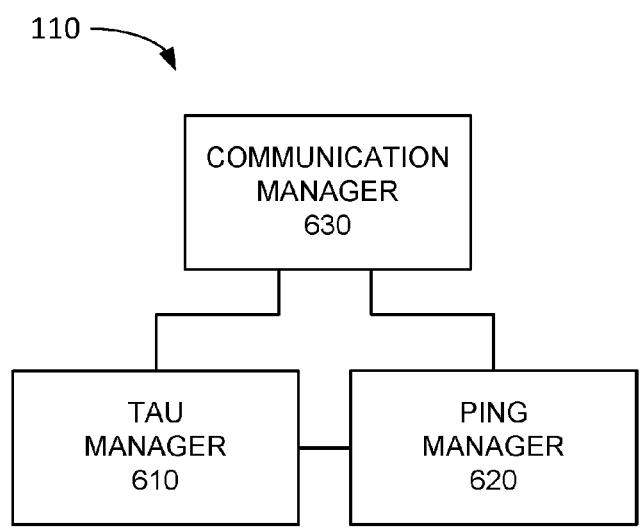
FIG. 6 is a diagram illustrating exemplary functional components of the user equipment device of FIG. 1.

FIG. 6 is a diagram illustrating exemplary functional components of UE device 110 according to an implementation described herein. The functional components of UE device 110 may be implemented, for example, via processing unit 510 executing instructions from memory 520. Alternatively, some or all of the functional components of UE device 110 may be implemented via hard-wired circuitry (e.g., in a chipset included as part of communication interface 540). As shown in FIG. 5, device 500 may include a TAU manager 610, a ping manager 620, and a communication manager 630.

TAU manager 610 may generate a TAU in response to a TAU timer expiring, in response to detecting a new tracking area, and/or in response to another type of triggering event, such as a detected alarm condition, a detected fault condition, and/or a detected sensor event. TAU manager 610 may send the TAU to MME 220 and may receive a TAU response from MME 220 acknowledging that the TAU has been received.

Ping manager 620 may send ping messages to application system 150 in response to a ping timer expiring and/or in response to another type of triggering event, such as a detected alarm condition, a detected fault condition, and/or a detected sensor event. Ping manager 620 may receive a ping response from application system 150 acknowledging that the ping message has been received and may process the ping response. For example, ping manager 620 may send a notification to an application or process running on UE device 110 indicating a quality of the connection to application system 150 based on the received ping response.

Communication manager 630 may control TAU manager 610 and ping manager 620. For example, communication manager 630 may instruct ping manager 620 to cease sending ping messages to application system 150 and may further instruct ping manager 620 to retrieve ping message information from TAU responses received by TAU manager 610. In some implementations, communication manager 630 may instruct TAU manager 610 to include particular types of information intended for application system 150 when sending a TAU to MME 220 and the included information may be provided by MME 220 to application system 150 in a ping message generated based on the TAU.

Although FIG. 6 shows exemplary functional components of UE device 110, in other implementations, UE device 110 may include fewer functional components, different functional components, differently arranged functional components, or additional functional components than depicted in FIG. 6. Additionally or alternatively, one or more functional components of UE device 110 may perform functions described as being performed by one or more other functional components of UE device 110.

Figure 7:
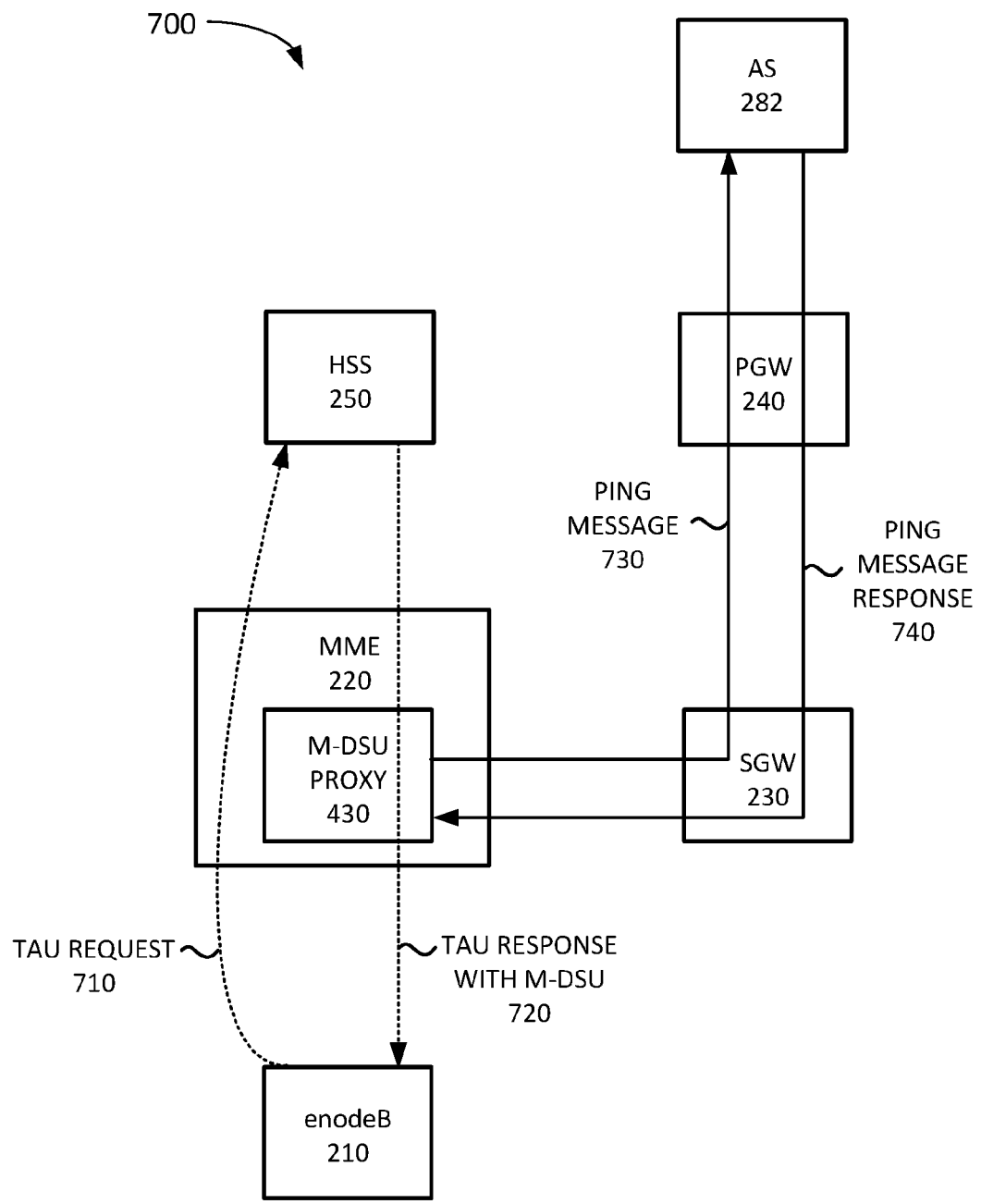
FIG. 7 is a diagram illustrating an exemplary signal flow overview according to an implementation described herein.

FIG. 7 is a diagram illustrating an exemplary signal flow overview 700 according to an implementation described herein. As shown in FIG. 7, signal flow overview 700 includes TAU request 710 that is sent by UE device 110 (not shown in FIG. 7) to eNodeB 210 and forwarded by eNodeB 210 to MME 220. MME 220 forward the TAU request 710 to HSS 250 associated with UE device 110. HSS 250 responds with a TAU response 720, which is intercepted by M-DSU proxy 430. M-DSU proxy 430 generates a ping message 730 that provides a device status update to AS 282 (which in this implementation corresponds to application system 150). The device status update may inform AS 282 that UE device 110 continues to be available and reachable. AS 282 may respond with a ping message response 740 that includes an acknowledgment of the received device status update. Ping message response 740 may include information identifying AS 282 (e.g., an IP address for AS 282), packet loss information, round trip time information, and/or other types of information. M-DSU proxy 430 may incorporate information from ping message response 740 and MME 220 may send TAU response 720 to UE device 110 via eNodeB 210.

Figure 8:
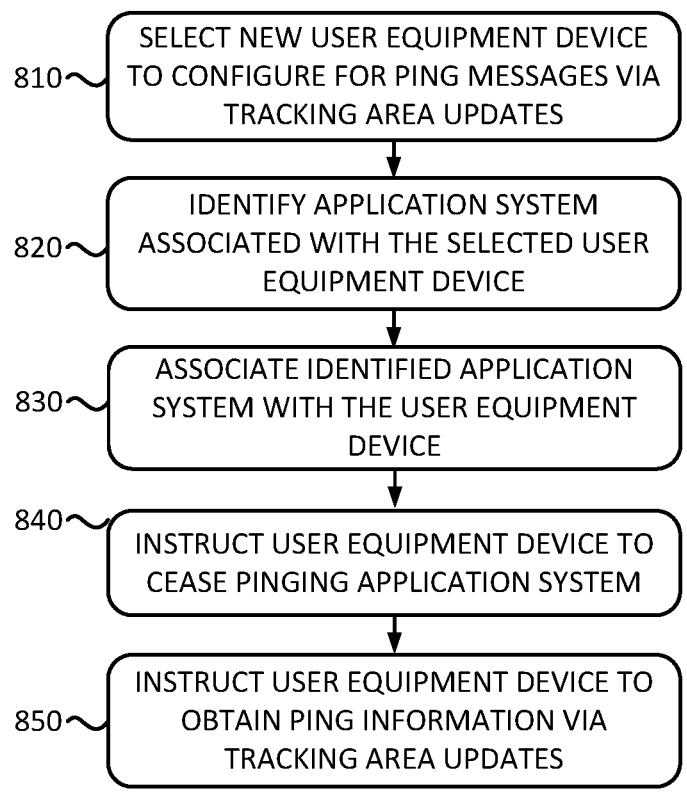
FIG. 8 is a flowchart of a process for configuring a new user equipment device according to an implementation described herein.

FIG. 8 is a flowchart of a process for configuring a new user equipment device according to an implementation described herein. In some implementations, the process of FIG. 8 may be performed by MME 220. In other implementations, some or all of the process of FIG. 8 may be performed by another device or a group of devices separate from MME 220. For example, some or all of the process of FIG. 8 may be performed by AS 282.

The process of FIG. 8 may include selecting a new UE device 110 to configure for ping messages via TAUs (block 810). As an example, MME 220 may detect that a new UE device 110 has attached to access network 120 and is associated with a tracking area managed by MME 220. Furthermore, MME 220 may determine that UE device 110 corresponds to a device type for which ping messages over the radio link should be suppressed and sent instead using TAU messages. For an example, MME 220 may determine that UE device 110 corresponds to an MTC device. As another example, MME 220 may determine that UE device 110 has been sending ping messages at a rate that exceeds a ping message rate threshold and may select to instruct UE device 110 to cease sending ping messages (or reduce the number of ping messages) in order to conserve radio link resources. As yet another example, a device managing radio link resources may directly instruct UE device 110 to cease sending ping messages or may instruct MME 220 to instruct UE device 110 to cease sending ping messages.

An application system associated with the selected UE device 110 may be identified (block 820) and the identified application system may be associated with the selected UE device (block 830). For example, MME 220 may determine application system 150 is associated with UE device 110 and may store information identifying application system 150 (e.g., the IP address) in AS DB 460. Application system 150 associated with UE device 110 may be identified by querying UE device 110, by intercepting ping messages sent by UE device 110 to application system 150, based on information provided to MME 220 by application system 150, based on information stored in UE DB 420, based on information received from an MTC management device, and/or using another technique.

UE device 110 may be instructed to cease pinging application system 150 (block 840) and to obtain ping information via TAUs (block 850). For example, MME 220 may send one or more instructions to communication manager 630 of UE device 110 to cease sending ping messages to application system 150 and to retrieve ping information from TAU responses received by UE device 110.

Figure 9:
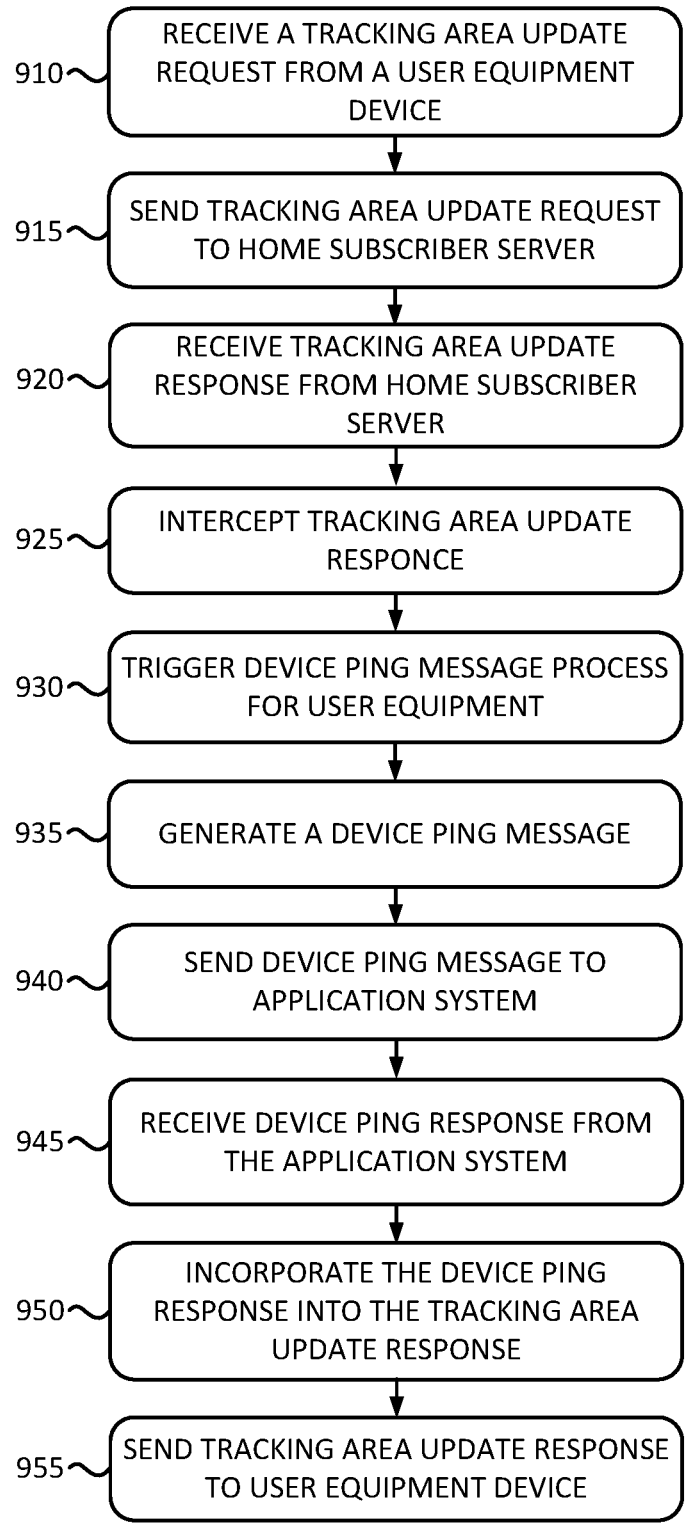
FIG. 9 is a flowchart of a process for using a tracking area update for a ping message according to an implementation described herein.

FIG. 9 is a flowchart of a process for using a tracking area update for a ping message according to an implementation described herein. In some implementations, the process of FIG. 9 may be performed by MME 220. In other implementations, some or all of the process of FIG. 9 may be performed by another device or a group of devices separate from MME 220.

The process of FIG. 9 may include receiving a TAU from a UE device (block 910), sending the TAU to the HSS 250 (block 915), and receiving a TAU response from HSS 250 (block 920). For example, MME 220 may receive a TAU from UE device 110, may identify HSS 250, associated with UE device 110, based on information stored in UE DB 420, may forward the TAU to the identified HSS 250, and may receive a TAU response from HSS 250.

The TAU response may be intercepted (block 925) and a device ping message process for UE device 110 may be triggered (block 930). For example, M-DSU proxy 430 may intercept the TAU response and delay the sending of the TAU response to UE device 110 until a device ping message process is carried out. A device ping message may be generated (block 935) and sent to application system 150 (block 940). For example, M-DSU proxy 430 may generate a ping message and send the ping message to application system 150. Application system 150 may perceive the ping message as if it was received from UE device 110.

The ping message may include information identifying UE device 110. In some implementations, the ping message may include additional information associated with UE device 110, such as location information for UE device 110, information identifying a state of UE device 110 (e.g., active, idle, powered down, etc.), information identifying group membership for UE device 110 (e.g., a particular sensor set, etc.), information identifying a battery level for UE device 110, information identifying one or more signal quality metrics for UE device 110, and/or other types of UE information.

A device ping response may be received from application system 150 (block 945), incorporated into the TAU response (block 950), and the TAU response may be sent to UE device 110 (block 955). For example, M-DSU proxy 430 may receive the ping response from application system 150, incorporate information from the ping response into the intercepted TAU response, and MME 220 may send the TAU response with the incorporated ping response to UE device 110. The ping response information may be included in one or more fields of the TAU response. In some implementations, an existing field of the TAU response may be used to include the ping information. In other implementations, a new field may be added to the TAU response and the ping information may be included in the new field.

The ping response information may include ping message information, such as an Internet Protocol (IP) address associated with the application system, packet loss information, roundtrip time information, and/or other types of ping message information. Furthermore, in some implementations, the ping response information may include additional or different types of information, such as an update from application system 150. The update may include instructions for UE device 110, a request for UE device 110 to provide a particular type of information to application system 150, authentication information for UE device 110, and/or other types of information.

Figure 10:
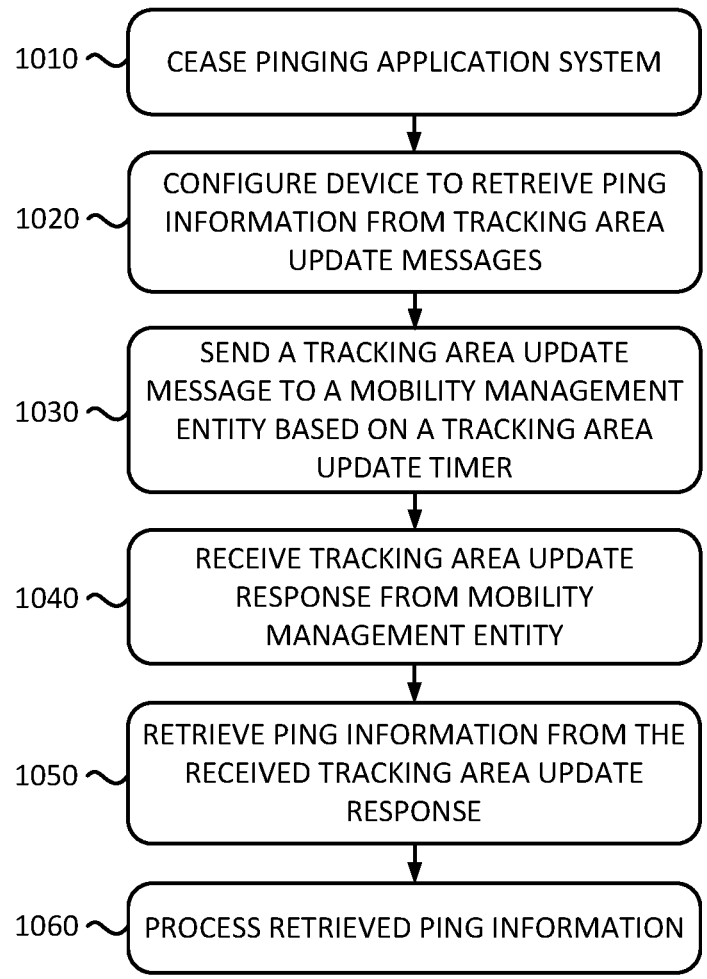
FIG. 10 is a flowchart of a process for receiving a ping message via a tracking area update according to an implementation described herein.

FIG. 10 is a flowchart of a process for receiving a ping message via a tracking area update according to an implementation described herein. In some implementations, the process of FIG. 10 may be performed by UE device 110. In other implementations, some or all of the process of FIG. 10 may be performed by another device or a group of devices separate from UE device 110.

The process of FIG. 10 may include ceasing to ping application system 150 (block 1010) and configuring UE device 110 to retrieve ping information from TAU messages (block 1020). For example, communication manager 630 may receive an instruction from MME 220, from application system 150, and/or from another device to cease pinging application system 150 and to retrieve ping information from messages received by TAU manager 610. In response, communication manager 630 may instruct ping manager 620 to cease sending ping messages and to retrieve ping information from TAU manager 610 when TAU manager 610 receives a TAU response.

A TAU message may be sent to MME 220 based on a TAU timer (block 1030) and a TAU response may be received from MME 220 (block 1040). For example, TAU manager 610 may detect that a TAU timer has expired, may send a TAU request to MME 220 via eNodeB 210, and may reset the TAU timer. TAU manager 610 may then receive a TAU response from MME 220. The TAU response may include ping information based on a ping response received by MME 220 from application system 150, as described above with respect to FIG. 9.

Ping information may be retrieved from the received TAU response (block 1050) and processed (block 1060). For example, ping manager 620 may retrieve the ping information from the TAU response by accessing one or more fields included in the TAU response. Ping manager 620 may then process the retrieved ping information. For example, ping manager 620 may inform a particular application or process running on UE device 110 that the connection to application system 150 is available, may provide information relating to the roundtrip time or packet loss to the particular application or process, and/or may perform another type of action. For example, if the packet loss information included in the ping information indicates that the packet loss exceeds a packet loss threshold, ping manager 620 may send an alert to communication manager 630 and communication manager 630 may attempt to improve the quality of the connection (e.g., by switching to a different radio link band).

Figure 11:
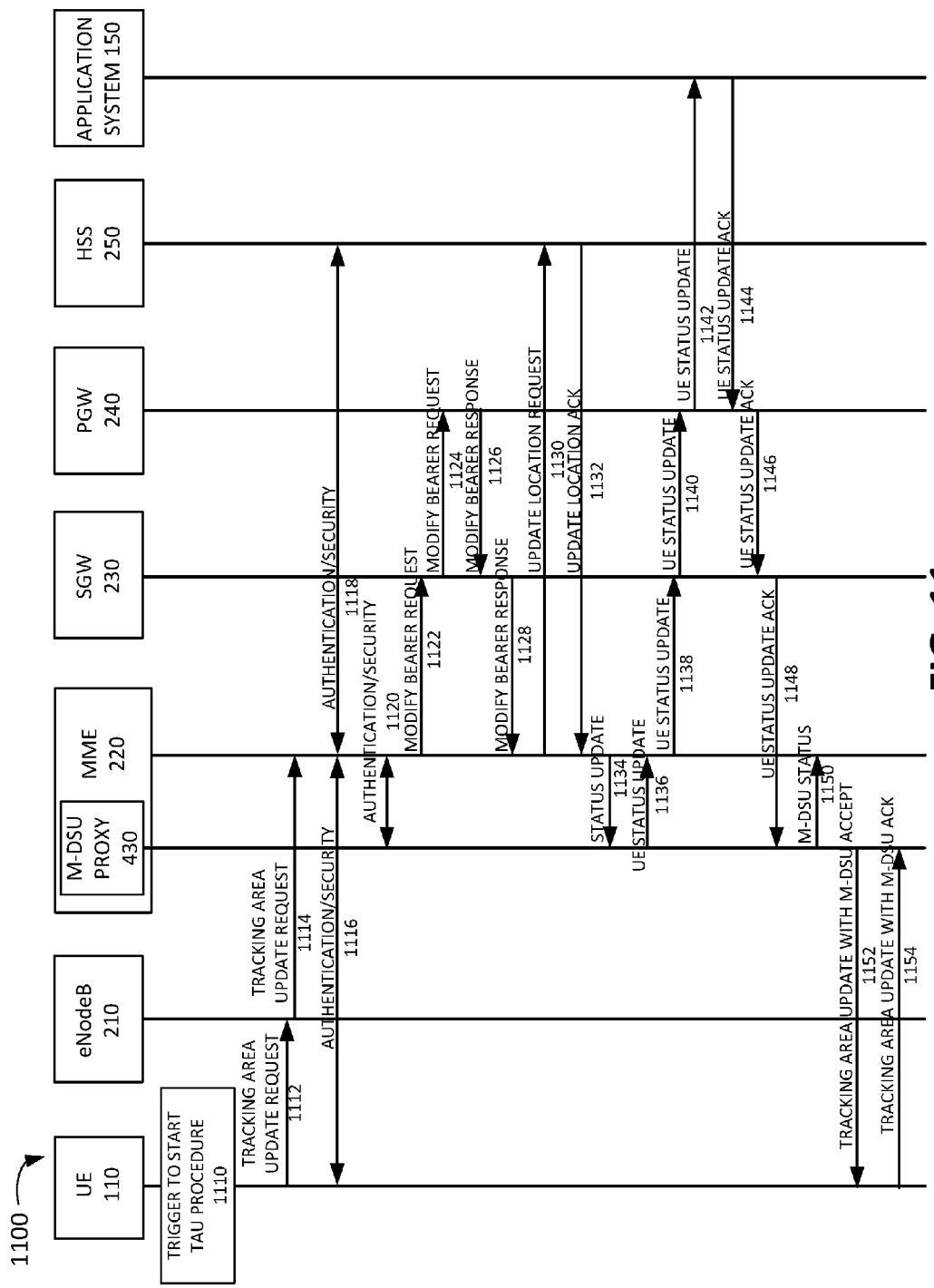
FIG. 11 is a diagram of an exemplary signal flow according to an implementation described herein.

FIG. 11 is a diagram of an exemplary signal flow 1100 according to an implementation described herein. Signal flow 1110 may include a trigger to start the TAU procedure, such as a TAU timer expiring (block 1110). UE device 110 may send a TAU request to eNodeB 210 (signal 1112) and eNodeB 210 may forward the TAU request to MME 220 (signal 1114). MME 220 may authenticate UE 110 with HSS 250 (signals 1116 and 1118) and may perform an authentication process with M-DSU proxy 430 (signal 1120). For example, M-DSU proxy 430 may require authentication before performing a ping process on behalf of UE device 110.

MME 220 may then process the TAU request and may perform a modify bearer procedure as part of the TAU request (e.g., if information included in the TAU request indicates that a bearer needs to be modified). MME 220 may send a modify bearer request to PGW 240 via SGW 230 (signals 1122 and 1124) and PGW 240 may respond with a modify bearer response via SGW 230 (signals 1126 and 1128). MME 220 may then send an update location request to HSS 250 based on the TAU request (signal 1130) and HSS 250 may respond with an update location acknowledgement as a TAU response (signal 1132). M-DSU proxy 430 may intercept the TAU response (signal 1134) and may trigger a device ping process.

M-DSU proxy 430 may obtain information about UE device 110 (e.g., information identifying UE device 110, such as a Global Unique Temporary Identifier (GUTI), etc.) and may include the information in a device ping message sent as a device status update to application system 150 via SGW 230 and PGW 240 (signals 1138, 1140, and 1142). Application system 150 may respond with a device ping message response sent as a device status update acknowledgement message back to M-DSU proxy 430 via PGW 240 and SGW 230 (signals 1144, 1146, and 1148). M-DSU proxy 430 may receive the device status update acknowledgement message and may retrieve ping information, and/or other types of information (e.g., an update from application system 150), from the received message and may incorporate the retrieved ping information into the intercepted TAU response (signal 1150) by providing an M-DSU status message to MME 220. The ping information may be incorporated into an existing field of the TAU response or a new field may be added to the TAU response. The TAU response may then be sent to UE 110 via eNodeB 210 (signal 1152) and UE 110 may acknowledge that the TAU response has been received (signal 1154).

The implementations described herein result in technical improvements of a wireless access network by saving radio link resources. For example, reducing the number of ping messages and using TAU messages to exchange information between UE device 110 and application system 150 may result in a reduced number of messages and in reduced use of radio bands and/or channels by eNodeB 210. Furthermore, less frequent sending of messages by UE devices 110 may conserve battery life for UE devices 110.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 8-10 and 8, and a series of signal flows has been described with respect to FIGS. 7 and 11, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:
    intercepting, by the computer device, a tracking area update response from a wireless network device to a user equipment device;
    delaying, by the computer device, sending of the intercepted tracking area update response to the user equipment device until a device ping process is performed;
    triggering, by the computer device, the device ping process for the user equipment device, in response to intercepting the tracking area update response;
    generating, by the computer device, a device ping message based on the triggering;
    sending, by the computer device, the device ping message to an application system associated with the user equipment device;
    receiving, by the computer device, a device ping response from the application system;
    incorporating, by the computer device, information from the device ping response into the intercepted tracking area update response; and
    sending, by the computer device, the tracking area update response with the incorporated device ping information to the user equipment device.

2. The method of claim 1, further comprising:
    receiving a tracking area update request from the user equipment device; and
    sending the tracking area update request to the wireless network device, wherein the tracking area update response from the wireless network device to the user equipment device is received in response to the tracking area update request.

3. The method of claim 1, wherein the computer device comprises a Mobility Management Entity that includes a Machine Type Communication device status update proxy configured to send ping messages to the application system on behalf of the user equipment device.

4. The method of claim 1, wherein the computer device comprises a Machine Type Communication device status update proxy device configured to send ping messages to the application system on behalf of the user equipment device and is configured to receive the tracking area update response from a Mobile Management Entity.

5. The method of claim 1, wherein the user equipment device includes a Machine Type Communication device.

6. The method of claim 1, further comprising:
    instructing the user equipment device to cease sending ping messages to the application system.

7. The method of claim 1, wherein the information from the device ping response includes ping message information, wherein the ping message information includes at least one of an Internet Protocol address of the application system, packet loss information associated with communication between the user equipment device and the application system, or roundtrip time associated with communication between the user equipment device and the application system.

8. The method of claim 1, wherein the information from the device ping response includes an update from the application system for the user equipment device.

9. The method of claim 8, wherein the update includes at least one of instructions for the user equipment device, a request for the user equipment device to provide information to the application system, or authentication information for the user equipment device.

10. The method of claim 1, wherein the device ping message includes information associated with the user equipment device, wherein the information associated with the user equipment device includes at least two of:
  location information for the user equipment device;
  information identifying a state associated with the user equipment device;
  information identifying a group membership associated with the user equipment device;
  information identifying a battery level associated with the user equipment device; or
  information identifying one or more signal strength metrics associated with the user equipment device.

11. A computer device comprising:
  a memory storing instructions; and
  a processor configured to execute the instructions to:
    intercept a tracking area update response from a wireless network device to a user equipment device;
    delay sending of the intercepted tracking area update response to the user equipment device until a device ping process is performed;
    trigger a device ping process for the user equipment device, in response to intercepting the tracking area update response;
    generate a device ping message based on the triggering;
    send the device ping message to an application system associated with the user equipment device;
    receive a device ping response from the application system;
    incorporate information from the device ping response into the intercepted tracking area update response; and
    send the tracking area update response with the incorporated device ping information to the user equipment device.

12. The computer device of claim 11, wherein the processor is further configured to:
  receive a tracking area update request from the user equipment device; and
  send the tracking area update request to the wireless network device, wherein the tracking area update response from the wireless network device to the user equipment device is received in response to the tracking area update request.

13. The computer device of claim 11, wherein the computer device comprises a Mobility Management Entity that includes a Machine Type Communication device status update proxy configured to send ping messages to the application system on behalf of the user equipment device.

14. The computer device of claim 11, wherein the computer device comprises a Machine Type Communication device status update proxy device configured to send ping messages to the application system on behalf of the user equipment device and is configured to receive the tracking area update response from a Mobile Management Entity.

15. The computer device of claim 11, wherein the user equipment device include a Machine Type Communication device.

16. The computer device of claim 11, wherein the processor is further configured to:
  instruct the user equipment device to cease sending ping messages to the application system.

17. The computer device of claim 11, wherein the information from the device ping response includes ping message information, wherein the ping message information includes at least one of an Internet Protocol address of the application system, packet loss information associated with communication between the user equipment device and the application system, or roundtrip time associated with communication between the user equipment device and the application system.

18. The computer device of claim 11, wherein the information from the device ping response includes an update from the application system for the user equipment device.

19. The computer device of claim 18, wherein the update includes at least one of instructions for the user equipment device, a request for the user equipment device to provide information to the application system, or authentication information for the user equipment device.

20. A non-transitory memory device storing instructions executable by one or more processors, the non-transitory memory device comprising:
  one or more instructions to receive a tracking area update response from a wireless network device to a user equipment device;
  one or more instructions to delay sending of the intercepted tracking area update response to the user equipment device until a device ping process is performed;
  one or more instructions to trigger a device ping process for the user equipment, in response to receiving the tracking area update response;
  one or more instructions to generate a device ping message based on the triggering;
  one or more instructions to send the device ping message to an application system associated with the user equipment device;
  one or more instructions to receive a device ping response from the application system;
  one or more instructions to incorporate information from the device ping response into the received tracking area update response; and
  one or more instructions to send the tracking area update response with the incorporated device ping information to the user equipment device.

* * * * *